United States Patent
Herbert

[15] 3,700,255
[45] Oct. 24, 1972

[54] PIVOTABLE AXLE
[72] Inventor: Daniel H. Herbert, 138 Ainsworth Ave., East Brunswick, N.J. 08816
[22] Filed: June 18, 1971
[21] Appl. No.: 154,353

[52] U.S. Cl. ..............................................280/81 A
[51] Int. Cl. ...........................................B62d 53/06
[58] Field of Search.................................280/81 A

[56] References Cited

UNITED STATES PATENTS

| | | |
|---|---|---|
| 3,044,795 | 7/1962 | Standing et al. .........280/81 A |
| 3,354,982 | 11/1967 | Schramm..............280/81 A X |
| 3,403,925 | 10/1968 | Sauer.......................280/81 A |

FOREIGN PATENTS OR APPLICATIONS

| | | |
|---|---|---|
| 289,491 | 3/1965 | Netherlands.............280/81 A |

*Primary Examiner*—Leo Friaglia
*Attorney*—Popper, Bain, Bobis & Gilfillan

[57] ABSTRACT

A trailer or truck axle which prevents scuff-wear of tires by yielding to a normal course with respect to the direction of travel by being anchorable at two different pivot points.

3 Claims, 8 Drawing Figures

PATENTED OCT 24 1972 3,700,255

INVENTOR.
DANIEL H. HERBERT
BY
Popper, Bain, Bobrov-Gilfillan
ATTORNEYS

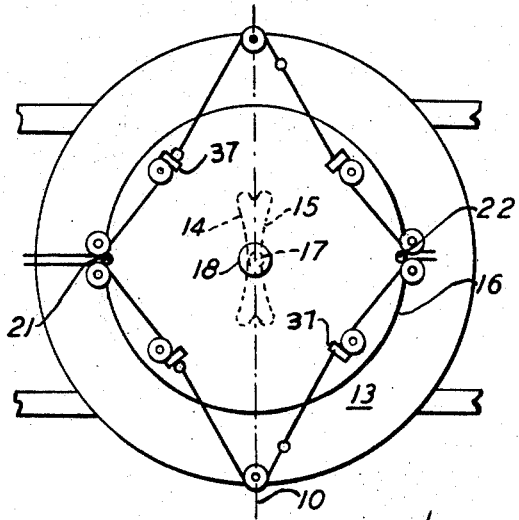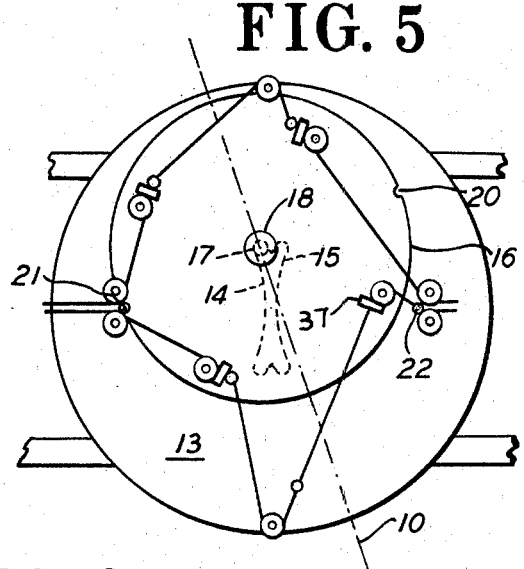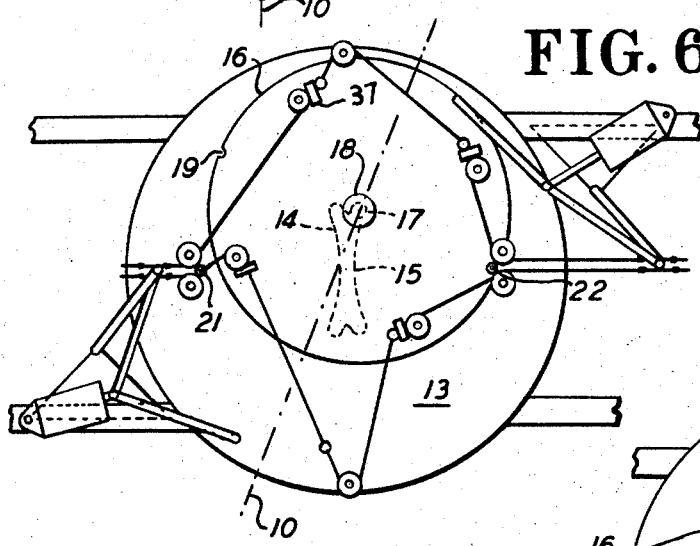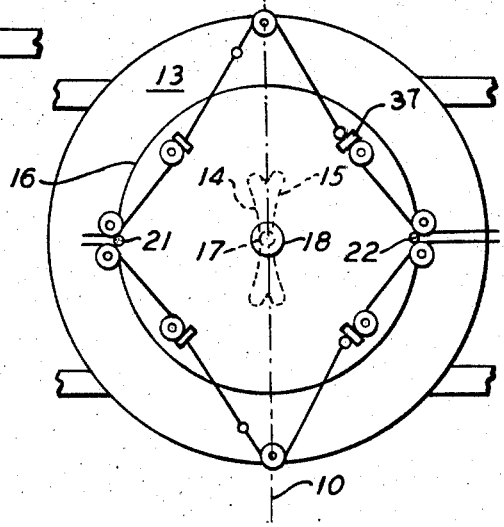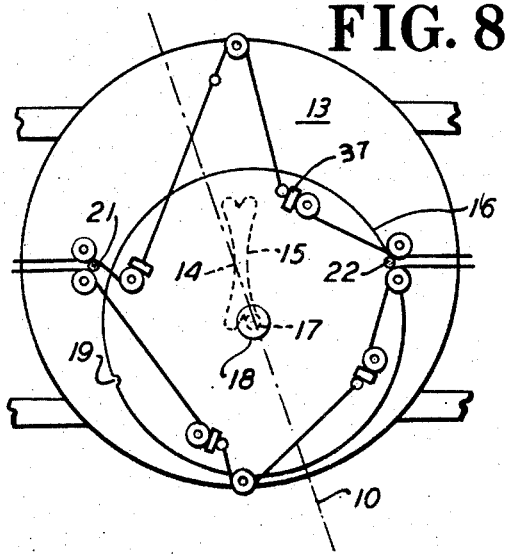

PIVOTABLE AXLE

BACKGROUND OF THE INVENTION

1. Field of the Invention

This invention relates generally to pivotable axles and specifically to pivotable actions for trailers or trucks which do not induce scuff-wear of tires.

2. Prior Art

Trucks and trailers having multiple axles cause excessive wear of tires because only one of the axles is able to maintain a course normal to the direction of travel and the other, when there is a turn or deviation from a straight course, is pulled sideways with respect to the direction of travel, producing excessive wear of the tires on that axle. This is particularly true of the axles which are rigidly mounted and unable to pivot. In order to reduce this excessive wear, axles have been devised which are pivotable but in many instances they do not yield to deviations from a straight course sufficiently to avoid scuff-wear and the component of horizontal friction on the tires soon demonstrates itself by noticeable wear beyond that which is shown by the tires which are able to persue a normal course. Many of these axles are unstable, complex, difficult to maneuver, unsafe on turns and curves, do not produce better weight distribution.

SUMMARY

It has been found that an axle may be devised which very substantially reduces horizontal friction on tires (scuff) reduces horizontal strain on the suspension system when making turns, is stable, is maneuverable, and safe. Weight distribution is better than on conventional devices, and the pivotable axle will be self-aligning under all normal conditions of operations. These axles may be spread further apart over the frame of the vehicle and they may even be applied in greater numbers to vehicles of great length. The result is less concentrated weight on the highway or bridges that they traverse. The device provided for the substantial elimination of scuff-wear is an additional axle mounted for engagement with two different pivot points, one for forward motion and one for rearward motion.

DRAWINGS

These objects and advantages as well as other objects and advantages may be obtained by the device shown by way of illustration in the drawings in which:

FIG. 4 is a schematic view showing the pivotable axle positioned for normal straight, forward motion;

FIG. 5 is a schematic view showing the axle pivoted for traversing a curve to the left;

FIG. 6 is a schematic view showing the axle pivoted to traverse a course to the right looking to the rear;

FIG. 7 is a schematic view showing the axle pivoted to pursue a straight course to the rear; and FIG. 8 is a schematic view showing the axle pivoted to pursue a leftward course to the rear.

PREFERRED EMBODIMENT

Figure 1:
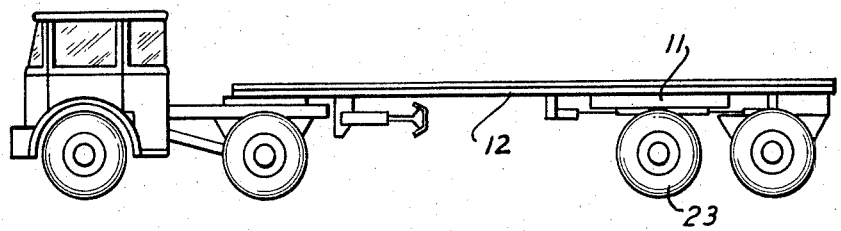
FIG. 1 is a tractor and trailer each having multiple axles.
Figure 2:
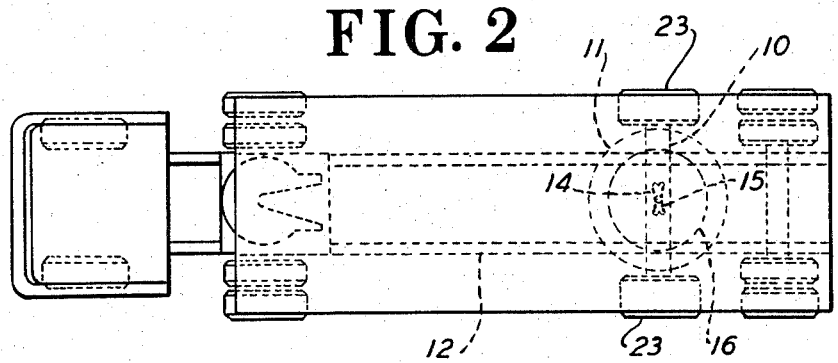
FIG. 2 is a top plan view of the tractor trailer shown in FIG. 1.

Referring now to the drawings in detail, the pivotable axle for trailers and trucks provides an upper plate 11 attached rigidly to the frame 12 of the vehicle. The bottom surface 13 of the plate 11 is smooth and is lubricated. The upper plate 11 has a pair of intersecting arcuate slots 14, 15. The front slot 14 has a center of curvature in front of an axle, and the rear slot has a center of curvature to the rear of an axle.

A smaller lower plate 16 is slidable on the upper plate 13. A center traverse pin 17 is attached to the center of the lower plate 16, and rides in the slots 14, 15. A large head 18 on the pin 17 keeps the lower plate 16 in sliding engagement with the upper plate 11 by over-riding the edges of the slots 14, 15. The slots 14, 15 extend equidistantly and symmetrically with respect to the center line of the frame 12. Thus, the pin 17 may slide from side to side in each of the slots 14, 15, as the lower plate 16 guides under the upper plate 13. An axle 10 for undriven wheels is mounted on the lower plate 16.

The sliding of the lower plate 16 is governed in the following manner. The lower plate 16 is provided diametrical front 19 and rear 20 pivot seats or indentations which are respectively engagable and disengagable with front 21 and rear 22 pivot pins. For forward movement of the vehicle, the front pivot indentation 19 is engaged with the front 21 pivot pin. This allows the axle 10 (shown symbolically by the dotted lines in FIGS. 4–8) to yield to the direction of forward travel. During rearward travel movement of the vehicle, the rear 22 pivot pin engages the rear pivot indentation, allowing the axle 10 to yield to the direction of rearward travel. In both directions of travel, the axle 10 pivots, yielding to the frictional engagement of the tires 23, until scuff is minimized by the axle turning to a position normal to the direction of travel.

Figure 3:
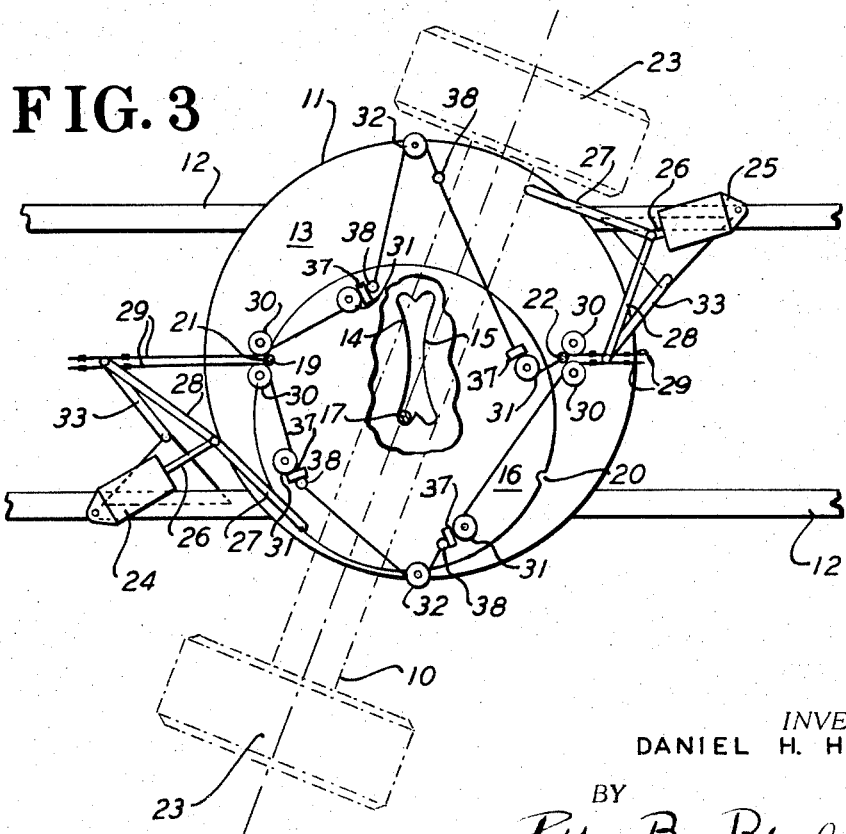
FIG. 3 is a bottom view of the pivotable axle, pivoted to a position suitable for traversing a curve to the right.

Control of pivoting of the lower plate 16 either on the front pin 21 being engaged with the front indentation 19 or the rear pin 22 being engaged with the rear indentation 20 is governed by a pair of opposite acting front 24 and rear 25 cylinders. When the front cylinder 24 is extended as shown in FIG. 3, the rear cylinder is simultaneously retracted. The cylinders 24, 25 are pivotably mounted on the frame 12. The drive rod 26 of each cylinder is connected to a pair of pivotable arms. One of each of the arms 27 is pivotably attached to the upper plate 11. The other of the pivotable arms 28 is attached to opposite ends a pair of cables 29, 29. Thus as the cylinders operate simultaneously, one cylinder 24 relaxes the ends of the cables 29, 29 at one end and the other cylinder 25 draws the other ends of the cables 29, 29 thereby seating the pins 21, 22 alternately in one or the other of the indentations 19,20. The lower plate 16 is moved to engage the indentations 19,20 with the pins 21,22 on the upper plate 13 by means of detents or balls 38 rigidly attached to the cables 29,29. These cables 29,29 extend (see FIG. 3) from the arms 27,28 over opposite pairs of rollers 30,30 mounted on the upper plate 11, from which they each are deflected over rollers 31,31 mounted on the lower plate 16. The cables 29,29 then pass over outer rollers 32,32 mounted diametrically on the opposite peripheral edge of the upper plate 11. From thence, the cables 29,29 pass over the next set of rollers 31 mounted on the lower plate 16, and then over the rollers 30,30 at the opposite end of the upper plate 11, beyond which, the cables 29,29 are attached to the arms 28,28 of the opposite cylinder 25. Radius rods 33 are attached to the frame 12 and also to the arms 28,28 to compel them to draw the cables. The detents or balls 38 are rigidly mounted to engage guides 37 on the lower plate 16 and to thereby drive the lower plate 16 to seat the pivot pins 21,22 alternately in engagement with the pivot pins 21,22. The guides 37 are positioned on the lower plate 16 between the rollers 31 and the outer rollers 32. The guides 37 are blocks having a passage for the cables 29 to pass through. The guides 37 are rigidly attached to the lower plate 16.

Normal forward movement of the vehicle is shown in FIG. 4, in which the axle 10 is perpendicular to the center line of the frame. Forward to the left is shown by the position of the axle 10 in FIG. 5. Forward to the right is shown by the position of the axle in FIG. 3. Looking rearward and turning to the left is shown by the position of the axle in FIG. 8. Looking rearward and turning to the right is shown by the position of the axle in FIG. 6. Looking rearward and proceeding straight is shown by the position of the axle in FIG. 7. In each case where a turn, rather than straight movement of the vehicle is indicated, it is noted that the lower plate 16 has pivoted by sliding the traverse pin 17 in either of the slots 14, 15. In this manner, the axle yields to the direction of travel and the tires 23, 23 are normal to that direction and move without scuff.

By way of illustration, the arcuate slots 14, 15 have been shown in the upper plate 11, and the traverse pin 17 on the lower plate 16. This conjunction of parts may be reversed so that that slots are in the lower plate and the pin on the upper plate. This equivalent reversal of parts functions in the same way to accomplish the same results.

I claim:

1. A pivotable axle comprising:
   a. a first plate,
   b. front and rear pivot pins on the first plate,
   c. a second plate slidable on the first plate,
   d. a pair of arcuate intersecting slots on one of the plates,
   e. a traverse pin on the other plate movable in the slots,
   f. a pair of pivot pin seats on the second plate for cooperative alternate engagement with either of the pivot pins,
   g. means to move the second plate to engage either of the pivot pins alternately with the corresponding pivot pin seat,
   h. an axle mounted on the second plate,
   i. wheels mounted on the axle,
   j. the second plate pivotable about whichever pivot pin is engaged with either pivot pin seat, in response to direction of travel of the wheels.

2. A pivotable axle according to claim 1 in which the means to move the second plate to engage either of the pivot pins alternately with the corresponding pivot pin seat comprises:
   a. a pair of oppositely acting cylinders,
   b. cables operably connected to the cylinders,
   c. guides on the second plate for slidably receiving the cables,
   d. detents mounted rigidly on the cables and engagable with the guides to move the second plate.

3. A pivotable axle according to claim 1 in which the means to move the second plate to engage either of the pivot pins alternately with the corresponding pivot pin seat comprises:
   a. a pair of oppositely acting cylinders,
   b. pairs of pulleys adjacent to the front and rear pivot pins on the first plate,
   c. a pair of peripheral guides on the second plate equidistant from one pivot pin seat, and a second pair of peripheral guides on the second plate equidistant from the opposite pivot pin seat,
   d. a cable attached to each of the cylinders and passing over one pulley at each of the pivot pins and through two of the guides,
   e. a cable also attached to each of the cylinders and passing over the other pulley at each of the pivot pins, and through the two remaining guides,
   f. pulleys at the outer diametrical edge of the first plate and receiving one of the cables,
   g. detents mounted on the cable and engagable with the guides, and operable to urge the second plate alternately toward the first and second pivot pins.

* * * * *